UNITED STATES PATENT OFFICE.

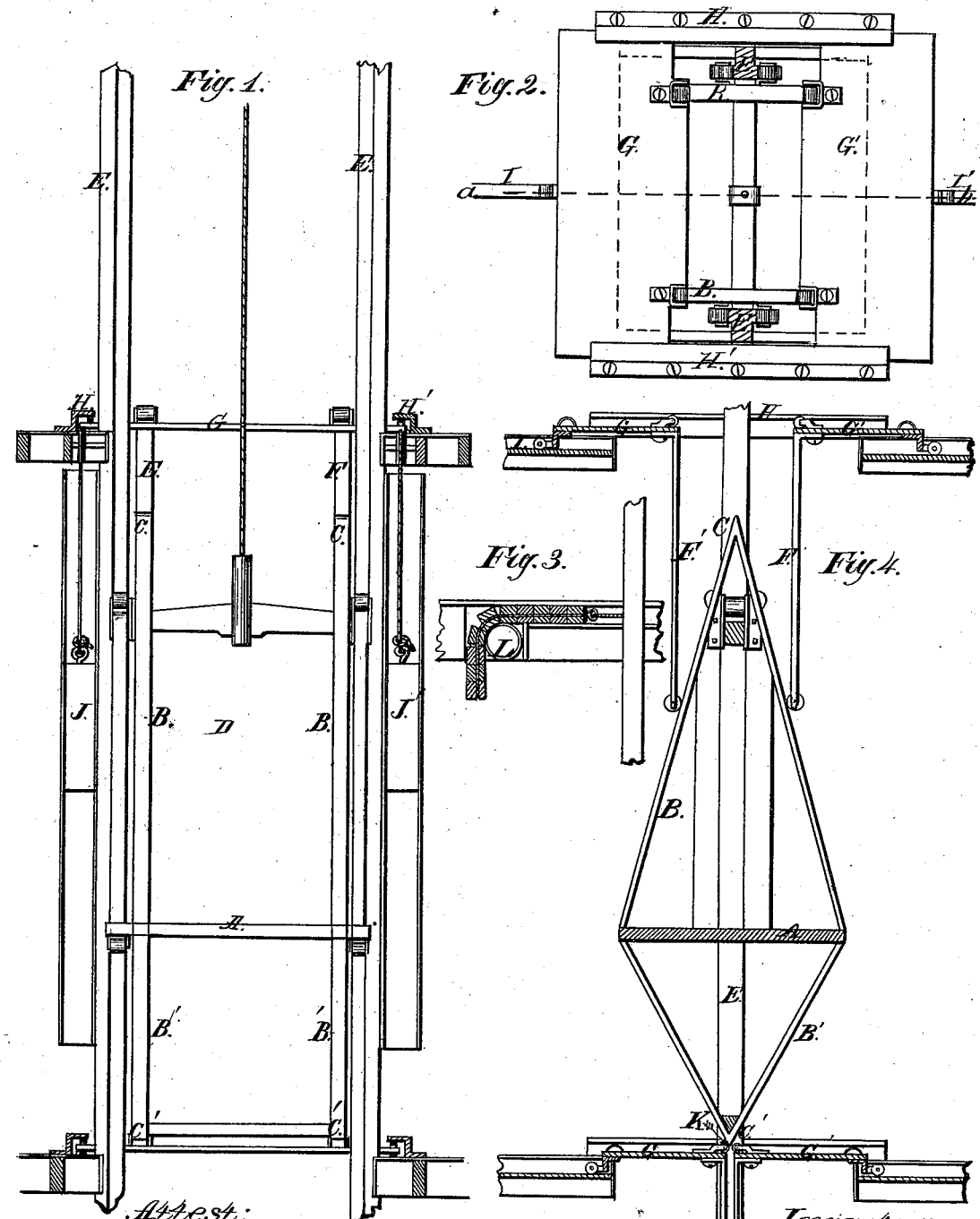

EDWARD A. HANDRAHAN, OF CINCINNATI, OHIO, ASSIGNOR TO HIMSELF AND JAMES SHERLOCK, OF SAME PLACE.

IMPROVEMENT IN SELF-OPERATING HATCHWAYS.

Specification forming part of Letters Patent No. 174,522, dated March 7, 1876; application filed February 3, 1876.

*To all whom it may concern:*

Be it known that I, EDWARD A. HANDRAHAN, of Cincinnati, in the county of Hamilton and State of Ohio, have invented certain new and useful Improvements in Automatic Hatchway-Covers, of which the following is a specification:

The object of my invention is to obviate the inconveniencies and prevent the accidents continually arising from open hatchways for elevators; and consists in a peculiar device whereby separate and equally-divided parts are made to gradually slide horizontally to and from the center of a hatchway, at each floor, and so constructed as to close automatically, by the time the cage has passed through, and form a complete cover for the same, and arranged to open gradually by means of wedge-shaped runners which encompass opposite sides of the platform of the cage and meet at a point above and below and near the center of the same, and operate upon arms which extend downward from each of the divided parts of the hatchway-cover in such a manner as to allow of that portion of the cage which extends above its platform to move through the hatchway while the sliding cover is nearly full open.

In the accompanying drawings, Figure 1 is a vertical elevation of a portion of an elevator with my invention attached, representing the floors and sliding covers in section. Fig. 2 is a plan view, in which the stage is represented as ascending and operating upon the sliding covers. Fig. 3 is a sectional elevation through line *a b* of the plan view, and Fig. 4 is a method of constructing the hatchway-cover when it is inconvenient to allow it to move on the floor in a horizontal direction on account of the hatchway being situated in the corner of a room.

Letters of like name and kind refer to like parts in each of the figures.

In the annexed drawing, A represents the platform of a cage, around which passes the wedged-shaped runners B B', passing above and below the same and meeting at points C C', near the center of the cage. The cage D slides upon uprights E, which serve as guides to keep it in the desired direction. The cage D, when approaching the floor from below, causes the points C of the runners B to enter between arms F F', which descend from and form part of the divided cover G G' of the hatchway, causing them to open in a horizontal direction, the plates H H' and grooves I I' serving as guides to cause them to move in parallel lines until they are opened sufficiently to allow the cage D to pass. As soon as the platform A has passed the cover G G', the opposing weights J J' are attached to each of the said parts G G', cause them to hang to and follow the runners B' until the points C' have left them, the hatchway is then covered. When the cage is descending the points C' of the runners B' enter between the parting cover G G' at K, causing it to open out in the manner above described until the platform A has passed it, when it hangs to and follows the runners B' in the manner above described until the arms F F' are free from the points C', the hatchway is then closed, the arms F F' serving to keep the hatchway open sufficiently to allow the load upon the platform A to pass unimpeded.

In Fig. 4 the sliding cover G G' is represented as being constructed of loose pieces strung upon the cable to which the weights J J' are attached, and so arranged as to be capable of passing over rollers L while being forced from the hatchway, and hang in a vertical position after passing the said roller.

Having thus described my invention, what I claim as new, and desire to secure by Letters Patent, is—

In an automatic hatchway-cover, the combination of the parts G G', weights J J', runners B B', and arms F F', substantially as and for the purpose specified.

In testimony whereof I have hereunto set my hand this 26th day of January, 1876.

EDWARD A. HANDRAHAN.

Witnesses:
 HENRY MILLWARD,
 D. W. STRICKLAND.